March 12, 1963 P. C. DIMITRACOPOULOS ETAL 3,081,383

METHOD AND MEANS FOR VARIABLE RESISTANCE RECORDING

Filed Oct. 30, 1959

INVENTORS.
PANAYOTIS C. DIMITRACOPOULOS,
CONSTANTINE D. PEZARIS,
BY
McMorrow, Berman + Davidson
ATTORNEYS.

United States Patent Office 3,081,383

Patented Mar. 12, 1963

3,081,383

METHOD AND MEANS FOR VARIABLE RESISTANCE RECORDING

Panayotis C. Dimitracopoulos, 2162 Sherbrooke St. W., and Constantine D. Pezaris, 2240 de la Vallee, both of Montreal, Quebec, Canada Filed Oct. 30, 1959, Ser. No. 849,850

6 Claims. (Cl. 179—100.4)

This invention relates to methods and means for sound, intelligence and impulse recording and reproduction, and more particularly to methods and means for recording and reproducing intelligence without requiring the use of intervening electromechanical transducers.

A main object of the invention is to provide a novel and improved intelligence sound and impulse recording medium of a nature which allows the direct conversion of recorded information on the medium into electrical signals or impulses without the necessity of using intervening electromechanical transducers.

A further object of the invention is to provide an improved method and means for directly converting information contained in undulations on a record tablet into electrical impulses without requiring the use of an intervening electromechanical transducer.

A still further object of the invention is to provide a novel and improved intelligence recording medium which is capable of storing and reproducing data in proportional or analog form, in either time-varying or direct current fashion, the tablet being simple in construction, being durable, and being easy to fabricate.

A still further object of the invention is to provide a novel and improved intelligence recording medium capable of storing and reproducing intelligence and also capable of acting as a modulator of direct or alternating current carriers according to the intelligence inscribed thereon.

A still further object of the invention is to provide an improved method and means for the direct conversion into electrical impulses of information inscribed or contained on an intelligence-carrying record tablet, the tablet being capable of storing and reproducing data in proportional or analog form in either time-varying or direct current fashion without requiring the use of intervening electromechanical transducers.

A still further object of the invention is to provide an improved intelligence-recording and reproducing technique that minimizes wear on the record tablet and allows for increased stylus-assembly compliance, thereby improving the fidelity of reproduction as over that obtained from the devices of the prior art.

A still further object of the invention is to provide an improved method and means for collecting proportional or analong data recorded on a novel recording medium, and for translating the recorded data into electrical signals, without requiring the use of electromechanical transducers.

Further objects and advantages of the invention will become apparent from the following description and claims and from the accompanying drawings, wherein:

Figures 1, 2, 3, 4, 5, 6:
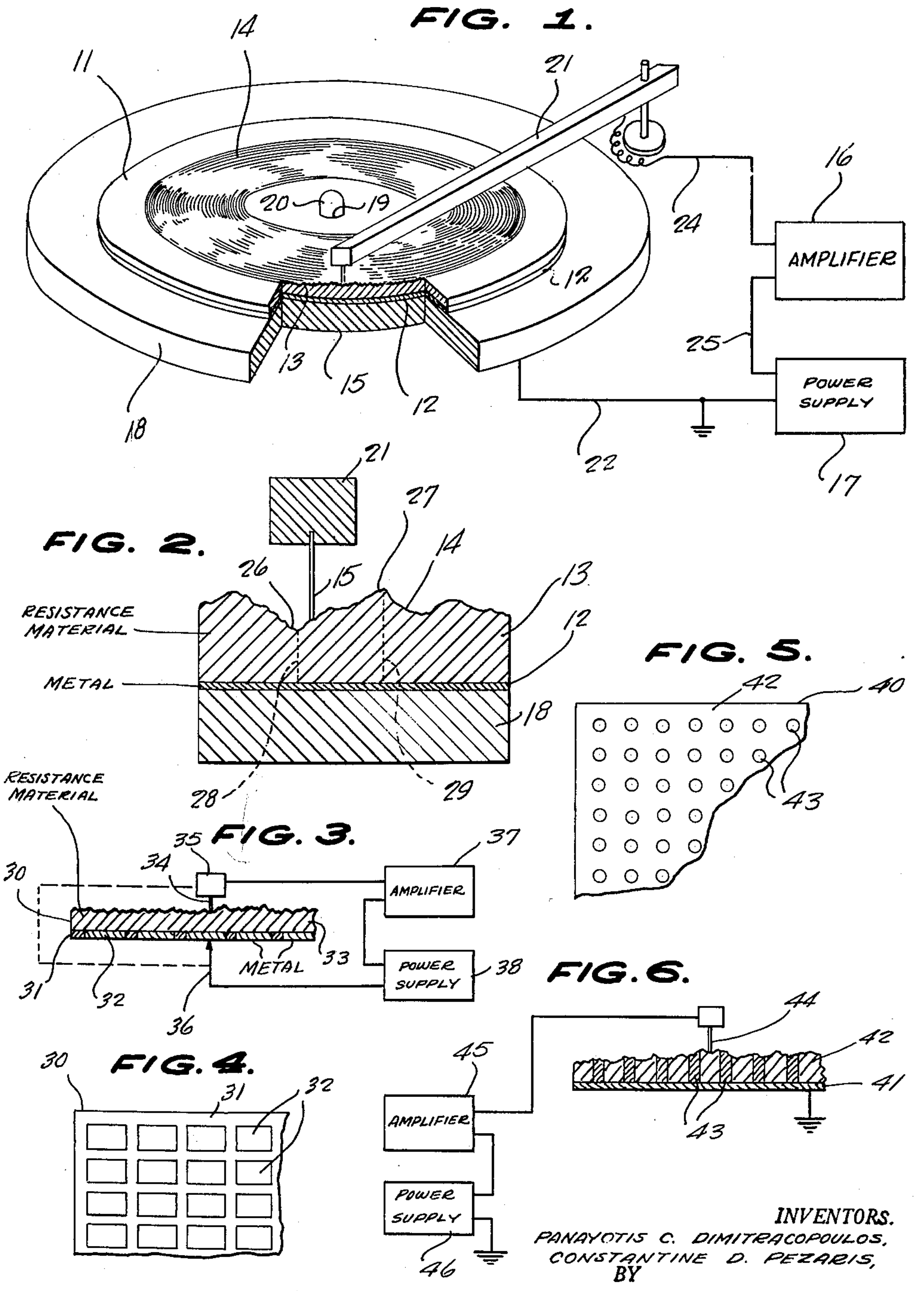
FIGURE 1 is a diagrammatic view of an improved playback system according to the present invention, showing a record tablet and the turntable therefor, portions of the tablet and turntable being broken away to show details of construction.
FIGURE 2 is an enlarged vertical cross sectional detail view taken through a portion of the record tablet and stylus arm of FIGURE 1, taken substantially in a vertical plane containing the stylus and tangential to one of the record grooves.
FIGURE 3 is a diagrammatic view of a reproducing system similar to FIGURE 1 but employing a modified form of intelligence-carrying tablet according to the present invention.
FIGURE 4 is a fragmentary bottom plan view of a portion of the information-carrying tablet of FIGURE 3.
FIGURE 5 is a top plane view of a portion of a further form of information-carrying tablet according to the present invention.
FIGURE 6 is a diagrammatic view of a playback system, similar to those shown in FIGURES 1 and 3, but employing the information-carrying tablet of FIGURE 5.

Commercially available phonographic systems heretofore employed and largely in present use consist of an apparatus in which an electromechanical transducer, commonly called a "pickup," terminating in a stylus, follows the undulations in the grooves of a record tablet, and translates these undulations into corresponding acoustical or electrical waves.

Thus, the principal components of modern phonographic systems consist of (*a*) the record tablet, and (*b*) an electromechanical transducer.

Therefore, in most of the existing phonographic systems, the record tablet serves only as a "carrier" of undulations, while the electromechanical transducer converts these undulations into mechanical vibrations, which are in turn converted into corresponding electrical impulses.

It is thus obvious that in a phonographic system, or corresponding translating system, the desired final product is an electrical signal. A prime purpose of the present invention is to provide the method and means for directly translating the undulations on a record tablet into an electrical signal without the necessity of using an intervening electromechanical transducer.

As will be readily apparent from the following description, the method of the present invention accomplishes the desired purpose by actually impressing on the record tablet physical undulations comprising resistance elements varying in height above a common reference plane, and thus providing corresponding variations in resistance with respect to a conductor located in said reference plane, in accordance with the signal to be reproduced. As will be further apparent, the varying heights of the resistance elements (and consequently their resistance values with respect to the reference conductor) will be substantially inversely proportional to the amplitude of the signal current waves at the resistance element, whereby the depth of cut required to produce the signal undulations must necessarily be substantially proportional to the strength of the applied signal in recording.

Thus, the system of the present invention includes recording means wherein a cutter may be employed to produce the record grooves, the depth of cut of the cutter being regulated in any suitable manner so that it follows the amplitude of the applied signal current, whereby the recorded undulations comprise successive resistance elements with resistance values varying substantially inversely in accordance with the amplitude of the applied signal waves employed in making the recording.

Referring to the drawings, and more particularly to FIGURES 1 and 2, 11 designates one embodiment of a record tablet according to the present invention, which comprises a flat circular disc consisting of a metal base layer 12 of uniform thickness and a top layer 13 of a material of homogeneous composition and having definite electrical resistance. Thus, the material of the top layer 13 may comprise a carbon composition, such as that employed in forming conventional carbon resistors, wherein carbon particles are mixed in a suitable matrix and thus bonded together, and wherein the material exhibits homogeneous resistive characteristics.

The resistive top layer 13 is formed with the spiral information-carrying undulated groove 14 which is formed with the standard vertical "hill and dale" undulations corresponding to the undulations of the recorded signal.

As above mentioned, the undulations may be formed by employing a cutter whose depth of penetration into the material is in accordance with the current strength of a signal, whereby to provide an accurate facsimile of the variations of the signal current along the record groove 14. Thus, the height of the material above the conductive base layer 12 will vary along the record groove substantially inversely in accordance with the strength of the signal current forming the undulations, and consequently, the resistance values of the resistance elements defined between a stylus member 15 and the base layer 12 as the stylus member travels along the groove will vary inversely in accordance with the depth of the groove. Since the resistance values between the stylus 15 and the base layer 12 are substantially inversely related to the cutter signal current values, the spiral record groove 14 may be employed as a means to directly reproduce the signal current applied to the record cutter by being employed as a variable resistance in a playback circuit.

Thus, as illustrated in FIGURE 1, the stylus element 15 may be connected to one input terminal of an amplifier 16, and the base layer 12 may be connected through a suitable source of current 17 to the other input terminal of the amplifier.

As shown in FIGURE 1, the record disc 11 is mounted on a conductive turntable 18 which is rotated by suitable means, well known in the art, at a speed corresponding to the speed of rotation employed in making the record groove 14. As the groove 14 moves past the point of the stylus 15, the varying resistance of the material 13 modulates the current in the input circuit of the amplifier 16 in accordance with the original signal wave impressed on the record tablet 11, whereby a signal corresponding to the original recorded signal is impressed on the input stage of the amplifier 16 and is subsequently reproduced by the usual apparatus connected to the output of the amplifier, for example, by a conventional loudspeaker.

The disc 11 is provided at its center with an aperture 19 adapted to receive the upstanding stop pin 20 associated with the turntable 18. The stylus 15 is carried by a conventional phonograph tone arm 21 which is pivotally connected to a suitable stationary support, not shown, and which is arranged so that the stylus member 15 may freely follow the spiral record groove 14 as the turntable 18 rotates. One terminal of the power supply 17 is connected by a suitable lead wire 22 and conventional rotatable contact means, for example, a suitable slip ring, to the conductive turntable 18, for example, by a ground connection, or alternatively by grounding the turntable 18 through its bearing means to the frame of its support, and grounding the lead wire 22. The stylus 15 is connected to the other input terminal of the amplifier 16 by a wire 24. The other input terminal of the amplifier is connected by a wire 25 to the ungrounded terminal of the power supply 17.

It will be readily apparent that due to the undulations of the groove 14, the resistance offered by the material 13 varies as the disc 11 rotates, for example, being a minimum at a "valley" 26 and being a maximum at a "crest" 27, as illustrated in FIGURE 2. At the "valley" 26, the current transverses a relatively short path 28 through the resistive material 13, whereby the resistance is relatively low and the current is high, whereas at the "crest" 27 the path 29 through the resistive material 13 is relatively long, whereby the resistance is high and the current in the amplifier input circuit is low. Since the resistance offered by the material 13 at any instant depends upon the length of path between the point of the stylus 15 and the base layer 12, the amplifier input current will vary inversely, producing a modulated electric current having the frequency components corresponding to the undulations in the record groove 14.

It will be noted that the modulations of the electric current applied to the input circuit of the amplifier 16 takes place within the record tablet itself and that no external electromechanical transducer, such as a phonograph cartridge, is necessary. Since the stylus 15 acts only as a "current collector," the pressure of the stylus on the record groove need be only sufficient to insure good contact between the stylus and the material 13, and therefore may be relatively light. This greatly reduces mechanical wear on the record and permits a construction in the tone arm 21 and stylus 15 which has large compliance, thus increasing the fidelity of reproduction.

While FIGURES 1 and 2 illustrate an arrangement wherein a single resistive layer 13 is employed on a conductive layer 12 of uniform thickness, it will be readily apparent that resistive layers 13 may be employed on both the top and bottom sides of the conductive layer of material 12, corresponding to the conventional disc record wherein recordings are provided on both top and bottom sides of the disc. This doubles the playing time of the record, since undulations may be inscribed on both sides of the record. Under these circumstances, the ground connection is made through the central aperture of the metal base plate 12, which engages around the upstanding pin element 20, said pin element 20 being conductively connected to the turntable 18.

Alternatively, the central portion of the record, or an annular ring near the circumference of the record, may consist of highly conductive material, whereby the ground connection may be made through such highly conductive portion of the record.

The principle of the present invention has been illustrated in FIGURES 1 and 2 as embodied in the use of a circular flat disc, as the information-carrying medium. However, the present invention may be embodied in record media of various different shapes, for example, cylindrical, rectangular or any other convenient shape, as well as in ribbon or tape form.

Furthermore, while FIGURES 1 and 2 illustrate application of the present invention in conjunction with a rotating turntable 18 and a tone arm 21, corresponding to the apparatus employed in present phonographic systems, it is obvious that an arrangement may be employed wherein the tone arm 21 or structure corresponding thereto rotates and the supporting means for the record disc 11 remains stationary, since it is merely necessary to provide relative movement between the stylus 15 and the record disc 11. Furthermore, the system of the present invention lends itself particularly well for all forms of intelligence and pulse recording and reproduction, and also for storing and reproduction of data in "proportional" or "analog" form. The information-carrying undulations on the resistive layer of material 13 are not required to comprise a guiding groove, since information-carrying undulations may be employed without the stylus-guiding feature. Information-carrying undulations on a disc-shaped, rectangular, cylindrical or ribbon-shaped record, in accordance with the present invention, may be completely independent of spiral or other types of "guiding grooves," and depending on the specific required use, a plurality of "channels" and one or several stylii may be employed to collect or "read out" the information carried by the undulations. As will be readily apparent, if no "guiding grooves" exist on the record, external conventional means will be employed to move the record relative to the stylus (or stylii) and thus bring successive parts of the information-carrying undulations in contact with the stylii.

Furthermore, a record tablet according to the present invention which is employed to store and reproduce data in proportional or analog form may furnish this information by being moved either in a forwardly or in a reverse direction relative to the stylus. It is also apparent that when the record moves relative to the stylus, information may be stored and reproduced in either time-varying or direct-current fashion. When the record remains stationary relative to the stylus, information may be stored and reproduced in direct-current fashion. To be more explicit, by using the novel record in an apparatus wherein this record is held stationary relative to the stylus, the record may be used to store and reproduce the same direct-current "command" for any desired length of time, whereby important space and cost-saving features are provided which have substantial practical advantages in analog and digital computers and other automatic-control devices.

If the specific application requires it, a second stylus substantially on the same axis as the first stylus 15 may be employed but on the opposite side of the tablet 11 to complete the electrical circuit leading to the input stage of the amplifier 16. In this case, the conductive base layer 12 may be omitted entirely from the disc.

As previously mentioned, whether the record moves relative to the stylus or the stylus moves relative to the record is immaterial in the use of the present invention, and depends primarily on the mechanical requirements of the system in which the invention is employed. Furthermore, mechanical or electromagnetic means, well known in the art, may be employed to develop either linear or rotary motion, between the record and the contact stylus, depending upon the pattern employed for recording the information on the tablet. Thus, the embodiments of FIGURES 3 and 4 and FIGURES 5 and 6 are typical examples wherein the information-carrying tablet is substantially rectangular in shape and wherein the information elements are disposed in rows rather than in a spiral track.

The power supply 17 is not necessarily a direct current power supply. Said power supply may be a high frequency generator whereby when the record tablet 11 moves with respect to the stylus 15, the variable resistivity paths in the record caused by the undulations therein will amplitude-modulate the high frequency. In this way the information-carrying record tablet 11 may act as an amplitude-modulating device for radio frequency carrier signals, and these signals may be transmitted directly, or after suitable amplification, either by wire or by electromagnetic transmission. For example, the record tablet may be employed in a simple intelligence transmitting device, for example, in a distress signal transmitter employed for aircraft, marine or other use.

Frequency-modulated intelligence may also be obtained indirectly by the employment of the present invention, if the power supply 17 is a direct current power supply and the amplitude-modulated signals thus produced from the record 11 are employed to control a suitable variable reactance device coupled to a suitable frequency generator, as employed in usual practice.

In some applications, it will be found desirable to substitute a discontinuous mosaic of conducting surfaces for the continuous base plate 12 of FIGURES 1 and 2. For example, in FIGURES 3 and 4 the information-carrying record tablet, designated generally at 30, is rectangular in form, and the base plate, shown at 31, comprises a matrix of insulating material in which are embedded the uniformly spaced rectangular conductive blocks 32. Designated at 33 is a dimensionally modulated layer of resistive material, similar to the resistive layer 13 of FIGURES 1 and 2. One surface of resistive material 33 is suitably information-modulated, while the other surface is in contact with the mosaic of conductive surfaces, generally designated at 32. The undulated surface of the information-carrying material 33 is conductively engaged by a stylus 34 carried by a suitable scanning arm arranged to successively scan the blocks 32 along a prearranged path or pattern. Coupled to the scanning member 35 is an opposing stylus member 36 which engages the bottom surface of the tablet 30 and which is coupled to move along with the stylus 34 in opposing relationship thereto so as to successively engage the blocks 32. The signals derived from the system shown in FIGURES 3 and 4 comprise pulses of current containing modulations corresponding to the irregularities in the surface of layer 33 engaged by the stylus 34. The resistance irregularities modulate the current furnished to the input stage of an amplifier 37 by a suitable power supply 38, similar to the arrangement illustrated in FIGURE 1.

FIGURES 5 and 6 illustrate another arrangement embodying the present invention where again the record tablet, designated generally at 40, is of rectangular form and is provided with the continuous conductive base layer 41. The base layer 41 is suitably secured to the bottom surface of a top layer 42 of insulating material in which are embedded the orthagonally arranged successive rows of uniformly spaced vertical columns of resistance material, shown at 43, the top surface of the tablet 40 being undulated along the successive rows of resistive elements 43 in accordance with the pulses of information to be recorded and reproduced. Thus, the stylus, shown at 44 is arranged so that it moves relatively to the respective rows of resistive elements 43, whereby the varying resistance developed by the elements in a circuit including the input stage of an amplifier 45 and a power supply 46 is modulated in accordance with the successive undulations on the top surfaces of the resistive elements 43.

As in the form of the invention of FIGURES 3 and 4, the stylus 44 is carried by a member forming part of a suitable scanning mechanism arranged to scan the undulated top surface of the tablet 40 along a desired or prearranged pattern, whereby to provide successive pulses modulated by the undulations in the top surfaces of the elements 43, when applied to the input stage of the amplifier 45.

As will be readily apparent, since the bottom ends of the resistive elements 43 are connected to a common conductor, namely, the base plate 41, the base plate 41 may be omitted and the tablet 40 may be employed on a suitable grounded support, which provides the common connection to the bottom ends of the resistive elements 43.

The resistive elements 43 may comprise vertical fibers of suitable resistive material embedded in the insulating layer 42 and spaced uniformly along the track of movement of the stylus 44, the top surface of the track being suitably undulated in accordance with the strength of the pulses to be recorded and reproduced.

Although the recording tablets illustrated in FIGURES 3, 4 and 6 were described as being substantially rectangular in shape, they may be of various other shapes, for example, cylindrical, disc-shaped or any other shape or form including ribbon or tape form.

While certain specific embodiments and applications of variable resistance records and certain specific embodiments of apparatus for reproducing intelligence or information by the use of the variable resistance records have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An information-carrying device comprising a layer of material including electrically resistive elements separated by insulating material, said electrically resistive elements being formed to vary in thickness along a predetermined pattern, the resistance values of the elements being directly proportional to their thicknesses, said elements being arranged to carry intelligence undulations along said pattern, said electrically resistive elements being in the form of discontinuous spaced elements distributed along said pattern.

2. An information-carrying device comprising a layer of electrically conductive material, and a layer of relatively resistive material disposed on said first-named layer, said layer of relatively resistive material being formed to define substantially vertical intelligence undulations along a predetermined pattern, the resistance of said second-named layer with respect to said first-named layer at any point being directly proportional to the height of said second-named layer at said point, at least one of said layers being provided with insulating means defining discontinuous spaced elements of the layer material.

3. An information-carrying record device comprising a layer of electrically conductive material, a layer of relatively resistive material disposed on at least one surface of said first-named layer, said second-named layer being inscribed with substantially vertical intelligence undulations along a predetermined pattern, whereby the vertical thickness of said second-named layer varies along said pattern, providing variable resistivity paths therealong between said first-named layer and the surface of said second-named layer in accordance with the amplitude of the undulations, the resistance of said second-named layer with respect to said first-named layer at any point being directly proportional to the height of said second-named layer at said point, at least one conductive stylus mechanically and conductively engageable with the surface of said second-named layer along said undulations, and means for moving the undulations relative to the stylus along said predetermined pattern, at least one of said layers being provided with insulating means defining discontinuous spaced elements of the layer material.

4. An information-carrying record device comprising a layer of electrically conductive material, a layer of relatively resistive material disposed on at least one surface of said first-named layer, said second-named layer being inscribed with substantially vertical intelligence undulations along a predetermined pattern, whereby the vertical thickness of said second-named layer varies along said pattern, providing variable resistivity paths therealong between said first-named layer and the surface of said second-named layer in accordance with the amplitude of the undulations, the resistance of said second-named layer with respect to said first-named layer at any point being directly proportional to the height of said second-named layer at said point, at least one conductive stylus mechanically and conductively engageable with the surface of said second-named layer along said undulations, means for moving the undulations relative to the stylus along said predetermined pattern, and means providing an electric current through said second-named layer and said stylus, whereby the electric current is modulated in amplitude in accordance with said intelligence undulations, at least one of said layers being provided with insulating means defining discontinuous spaced elements of the layer material.

5. An information-carrying record device comprising a layer including a discontinuous mosaic of conducting elements, and a layer of relatively resistive material mounted on said first-named layer, said second-named layer being formed with substantially vertical intelligence undulations along a predetermined pattern, whereby the vertical thickness of said second-named layer varies along said pattern, providing variable resistivity paths therealong between said conducting elements and the surface of said second-named layer, the resistance of said second-named layer with respect to a conductive element of the first-named layer at any point being directly proportional to the vertical thickness of said second-named layer at said point.

6. An information-carrying record device comprising a layer of electrically conductive material, and a layer of insulating material including spaced vertical columns of conducting relatively resistive material, said second-named layer being bonded on said first-named layer, said second-named layer being vertically undulated along the spaced vertical columns of relatively resistive material in a predetermined pattern, whereby the vertical height of the columns varies along said pattern, providing variable resistivity paths therealong between the outer surface of said vertical columns and the first-named layer, the resistance of a vertical column with respect to said first-named layer at any outer surface point thereof being directly proportional to the vertical height of the column at said point.

References Cited in the file of this patent

UNITED STATES PATENTS

| | | |
|---|---|---|
| 1,620,122 | Mutscheller | Mar. 8, 1927 |

FOREIGN PATENTS

| | | |
|---|---|---|
| 156,217 | Great Britain | Sept. 15, 1921 |
| 94,549 | Austria | Oct. 10, 1923 |

OTHER REFERENCES

"Repeating Electric Phonograph," R. M. Hunter, Electrical World, Nov. 26, 1887, page 278.

"How to Perfect the Phonograph," Bevill Science and Invention, May 1923, pp. 32 and 89.